(12) United States Patent
Forsans

(10) Patent No.: US 9,056,678 B2
(45) Date of Patent: Jun. 16, 2015

(54) SECURING/RELEASING DEVICE, AND RELATED AIRDROP DEVICE

(75) Inventor: Jean-Louis Forsans, Versailles (FR)

(73) Assignee: ETAT FRANCAIS REPRESENTE PAR LE DELEGUE GENERAL POUR L'ARMEMENT DGA/DS/SDPA, Bagneux (FR)

( * ) Notice: Subject to any disclaimer, the term of this patent is extended or adjusted under 35 U.S.C. 154(b) by 151 days.

(21) Appl. No.: 13/878,269

(22) PCT Filed: Oct. 7, 2011

(86) PCT No.: PCT/FR2011/000544
§ 371 (c)(1),
(2), (4) Date: May 31, 2013

(87) PCT Pub. No.: WO2012/045929
PCT Pub. Date: Apr. 12, 2012

(65) Prior Publication Data
US 2013/0240674 A1 Sep. 19, 2013

(30) Foreign Application Priority Data

Oct. 7, 2010 (FR) .................................... 10 03970
Oct. 8, 2010 (FR) .................................... 10 04002

(51) Int. Cl.
*B64D 1/12* (2006.01)
*B64D 17/56* (2006.01)
*B64D 17/62* (2006.01)

(52) U.S. Cl.
CPC *B64D 1/12* (2013.01); *B64D 17/56* (2013.01); *B64D 17/62* (2013.01)

(58) Field of Classification Search
USPC ....................................................... 244/137.4
See application file for complete search history.

(56) References Cited

U.S. PATENT DOCUMENTS

| 1,242,809 | A |   | 10/1917 | Irwin |              |
|-----------|---|---|---------|-------|--------------|
| 2,828,997 | A | * | 4/1958  | Waldorff et al. | ............ 294/82.25 |
| 3,761,122 | A | * | 9/1973  | Epstein | ....................... 294/82.33 |
| 4,358,146 | A | * | 11/1982 | Goudey | ...................... 294/82.33 |

(Continued)

FOREIGN PATENT DOCUMENTS

| FR | 870 356     | 3/1942 |
|----|-------------|--------|
| GB | 129 017     | 7/1919 |
| WO | 2008/086602 | 7/2008 |

OTHER PUBLICATIONS

International Search Report dated Mar. 6, 2012, corresponding to PCT/FR2011/000544.

*Primary Examiner* — Christopher P Ellis
*Assistant Examiner* — Medhat Badawi
(74) *Attorney, Agent, or Firm* — Young & Thompson

(57) ABSTRACT

In the field of devices for airdropping a load from a flying vehicle, there is provided a device for securing/releasing a first member (65) able to support a load of more than 20 kg, and a second member able to support this first member and the load, this second member including, on the one hand, a support (1) onto which are secured first elements including a sensor (26), for example of an altimeter or chronobarometric type, able to trigger, during the flight, the release of the first and second members upon exceeding a threshold or receiving an exterior signal, where the second member includes a hook (3) in two parts, one of which is movable (14) between an operative position and an inoperative position, and elements (7, 8, 25, 71, 76) for locking and unlocking the movable part of the hook in its operative position.

19 Claims, 7 Drawing Sheets

(56) References Cited

U.S. PATENT DOCUMENTS

| | | | |
|---|---|---|---|
| 4,389,907 A * | 6/1983 | Epstein | 294/82.33 |
| 4,426,051 A * | 1/1984 | Banks et al. | 244/137.3 |
| 5,123,374 A * | 6/1992 | McMillan | 114/230.3 |
| 5,288,037 A * | 2/1994 | Derrien | 244/102 SL |
| 5,687,931 A * | 11/1997 | Hogan | 244/151 B |
| 5,887,924 A * | 3/1999 | Green et al. | 294/82.33 |
| 6,257,524 B1 * | 7/2001 | Fitzgerald et al. | 244/142 |
| 7,004,618 B2 * | 2/2006 | Gartsbeyn | 368/97 |
| 7,461,817 B1 * | 12/2008 | Hansson et al. | 244/151 B |
| 7,648,104 B1 * | 1/2010 | Jakubowski et al. | 244/137.4 |
| 7,934,677 B2 * | 5/2011 | Hansson et al. | 244/10 |
| 7,934,683 B2 * | 5/2011 | Hansson et al. | 244/151 B |
| 8,052,091 B2 * | 11/2011 | Hansson et al. | 244/151 B |
| 8,272,598 B2 * | 9/2012 | Obkircher et al. | 244/151 B |
| 8,313,063 B2 * | 11/2012 | Fox, Jr. | 244/151 B |
| 8,418,965 B2 * | 4/2013 | Schnitzer | 244/137.4 |
| 8,646,724 B2 * | 2/2014 | Bonnet et al. | 244/54 |
| 2002/0088902 A1 * | 7/2002 | Griffin | 244/137.4 |
| 2004/0094672 A1 * | 5/2004 | Jakubowski et al. | 244/137.4 |
| 2006/0108478 A1 * | 5/2006 | Bajuyo et al. | 244/137.4 |
| 2007/0272800 A1 * | 11/2007 | Edelstein et al. | 244/137.4 |
| 2010/0001139 A1 * | 1/2010 | Humbert et al. | 244/137.4 |
| 2010/0193639 A1 * | 8/2010 | Spencer et al. | 244/137.4 |
| 2011/0042984 A1 * | 2/2011 | Rocourt et al. | 294/82.33 |

* cited by examiner

SECURING/RELEASING DEVICE, AND RELATED AIRDROP DEVICE

The invention relates to devices for airdropping a load from a flying vehicle.

Airdropping a load from a medium, high and very high height can be intended for the supplies of ground troops while overcoming threats which weigh on the road convoys, which are slower and more vulnerable in areas difficult to access or particularly hostile.

In addition, airdropping from a high height (7500 meters) allows to preserve the flying vehicles from possible missile shots.

The principle is based on the freefall of a load which can reach more than one ton, and then to slow down this load by opening load sails, namely a main parachute, at the latest moment possible for a precise landing while ensuring the integrity of the load.

Devices for airdropping a load from a flying vehicle comprising a first stabilization parachute, a second main parachute ensuring the final slowing down of the load and means able to deploy the second parachute at a certain altitude are known.

At the airdropping moment and right out of the plane, the first stabilization parachute, consisting of a sail of a reduced size, is unfolded. This sail is designed to stabilize the rotating load.

Less than 500 meters from the ground, the first parachute is released from the load while the second parachute is released.

To that end, the deployment means generally comprise a chrono-barometric trigger, pyrotechnic means and cutting means able to cut a strap connected to the first parachute. The breaking of this strap at least partially detaches the first parachute from the load, said first parachute moving away from it while carrying away the bag of the second parachute which can then deploy.

The chrono-barometric trigger is a device used for opening the sail during a parachute jump. At an altitude preset at the ground level, it releases a spring which drives a cable, an end of which is connected to it while the other end is connected to pyrotechnic disconnectors, the movement of the cable causing the triggering of the firing of two pyrotechnic disconnectors which propel two cutters which cut the strap that connects the load to the stabilizing sails.

The load and the stabilizing sails separate, this separation causing the unfolding of a new strap which opens the bag containing the main sails (load sails) of the second parachute designed to slow down the load up to the landing.

Taking into account the necessary strength of the one or more straps which must support a load which can be between 1 and 2 tons, and the force exerted by the load on the latter, there currently exists no other device for separating the first parachute from the load.

The pyrotechnic means are used to project the cutting means on the strap with a large force to cut it. Such a device has the disadvantage of being complicated and of not being reusable.

This system, which is satisfactory, has nevertheless two major disadvantages, namely a long and complex implementation, and a high cost in use since the pyrotechnic disconnectors are not reusable.

The aim of the invention is to provide an airdropping device that is completely and immediately reusable, simple, inexpensive and rapidly implementable.

The provided solution is, according to a first feature, a device for securing/releasing a first member able to support a load, possibly of several tons, and a second member able to support this first member and said load, this second member comprising a support onto which are secured:

first means able to trigger the release of said first and second members,
a hook comprising a first fixed part secured to the support and a second part able to support a part of the load and movable with respect to the first part between a first position called raised position where said first and second parts form a hook and a second position where the first and second parts do not form said hook anymore, the second movable part comprising a first end secured to the first part, for example by a rotation shaft and supporting at least partially the weight of said load and of the first member when the device is in operation,
locking and unlocking means of the first position of said second movable part of the hook, the first means being able to control the unlocking of the first position of said second movable part of the hook, the device being characterized by the fact that the locking means comprise a ball spindle comprising a plunger and a main body provided concentrically directly or indirectly in a bore having an axis OX made in the support or in a member which is secured to it, the first means being connected to the plunger of the spindle and/or able to control its displacement, and by the fact that, in operation, when the second movable part of the hook is locked in its first position called raised position and that the hook supports the first member and a load, the second movable part of the hook is able to exert, directly or indirectly, on the main body of the ball spindle and along the axis OX, a force F1 proportional to the mass of the first member and of the load.

The hook is in a position called operative position, able to support the first member only when, on the one hand, the second part of the hook is in its first position and, on the other hand, the locking and unlocking means are in the locked position and the sensor is able to control the unlocking of the second movable part of the hook.

According to a preferred feature, a securing/releasing device according to the invention is characterized by the fact that, in operation, when the hook supports the first member and a load, the second movable part of the hook is able to exert, directly or indirectly, a force decomposing in a first force F1 on the main body of the spindle along the axis OX and, where appropriate, a second force F2 on the main body of the spindle having an axis OY perpendicular to OX, the F1/F2 ratio of the first force to the second force being at least equal to 3 and preferably at least equal to 9.

Using the ball spindle and having a force exerted on it mainly along OX allows, on the one hand, the removal of the plunger from the main body of the spindle with a force of several kilograms, therefore compatible with the forces that the widespread chrono-barometric sensors may for example exert and, on the other hand, the maintaining in the locking position of the spindle even if a force of several kilograms is exerted on the ball spindle along the axis OX, and this whatever the mass of the load, from several kilograms to several tons.

According to a particular feature, a securing/releasing device according to the invention is characterized by the fact that the first means are able to control a partial or complete release of the plunger from the main body of the spindle.

According to another feature allowing to limit the force exerted on the spindle and resulting from the weight of the load, the locking means comprise a first movable assembly and a second movable assembly, the first assembly being constituted by said ball spindle able to assume at least two positions, of which a first position where it is secured to the support or in a member which is secured to it and a second position where it is released from the support or from the member which is secured to it, the second assembly being constituted by movable means between a first position called locking position where they are able, in cooperation with said spindle, to block the second part of the hook in its first position, and a second position of unlocking the second part of the hook.

According to a particular feature, the second assembly is constituted by an L-shaped locking finger secured to the support by a rotation shaft and being movable with respect to the support between a first position where a part of the second assembly is able to be in contact with the second movable part of the hook, the hook being then in its operative position and a second position able to allow the release of said second part of the hook from the locking finger and, possibly:

the locking finger comprises a base able to contact the free end of the second part of the hook and this base and this free end able to be in contact are of a rounded shape, for example of a semi-cylindrical shape, and/or the free end of the main body of the spindle lies on the first third of the length of the part of the locking finger which is perpendicular to it, starting from the base.

According to another feature, the first means comprise a sensor, for example of an altimeter or chrono-barometric type, able to trigger the release of said first and second members upon exceeding a threshold or receiving an exterior signal and, possibly the ball spindle is secured to a cable and the sensor is able to control the displacement of this cable upon exceeding a threshold or receiving an exterior signal.

According to another feature, a semicircular reel is secured to the support and, preferentially, the locking means are at least partially arranged on a side of this reel while the sensor is arranged on the other side of the reel and the cable lies partially on the reel.

The invention also relates to a device for airdropping a load from a flying vehicle comprising a securing/releasing device according to the invention, the support of which is connected, on the one hand, to a first parachute called stabilization parachute and, on the other hand, to the bag of a second parachute called main parachute and, possibly a device according to the invention comprises a first member secured to the main parachute and to a load and hung to said hook.

According to another feature, said first member comprises a middle cylindrical part and the lower part of the hook forms a cylindrical opening complementary to that of the cylindrical part of the first member.

Other advantages and features will become apparent from the description of an embodiment of the invention with reference to FIGS. 1 to 6, in which.

Figure 5:
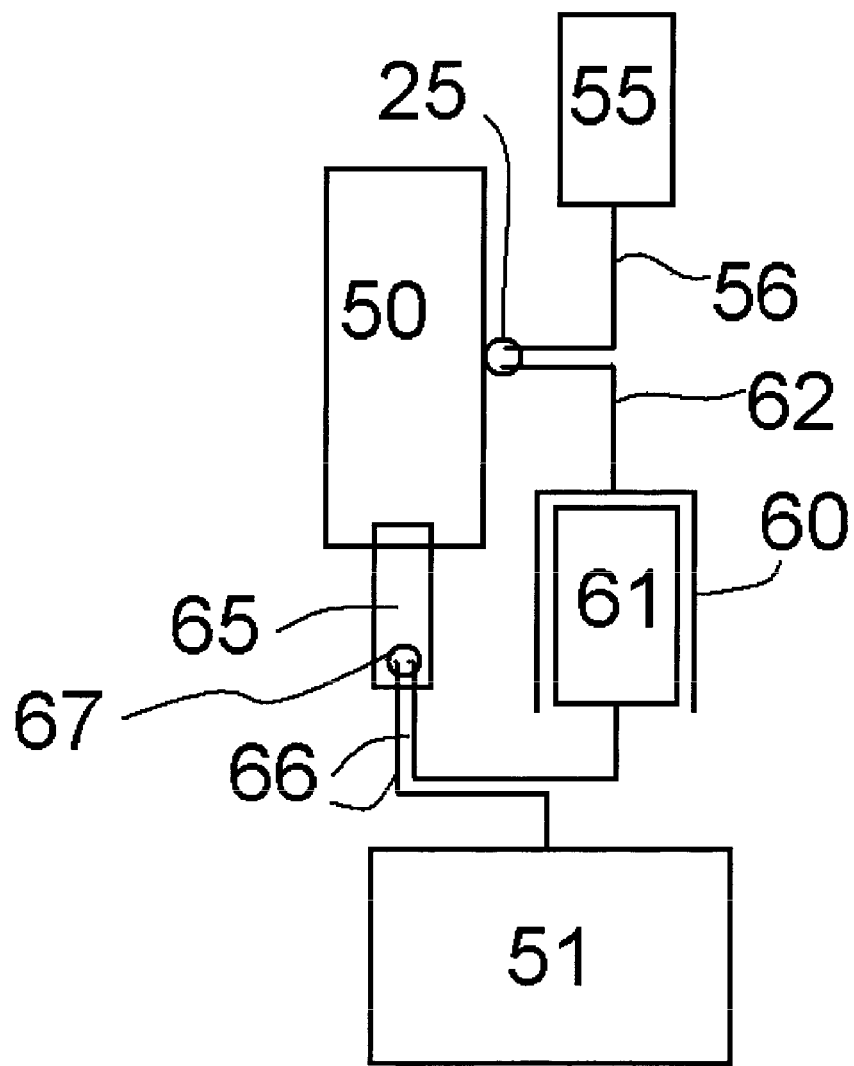
FIG. 5 shows the implementation of the device according to FIG. 1 to a device for airdropping a load.
Figure 6:
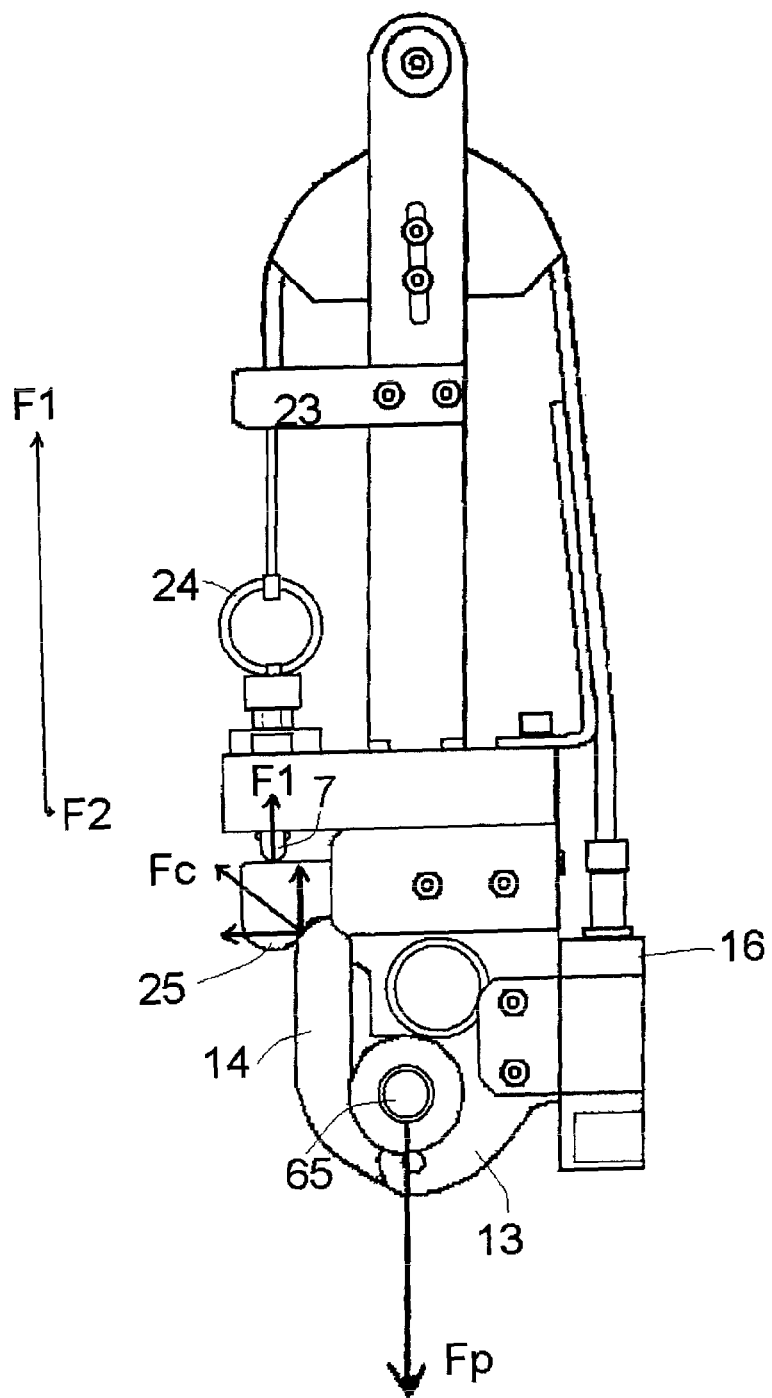

FIG. 6 schematizes the direction of the forces exerted by the movable part of the hook onto the locking finger in the context of an assembly according to FIG. 5.

Figure 7:
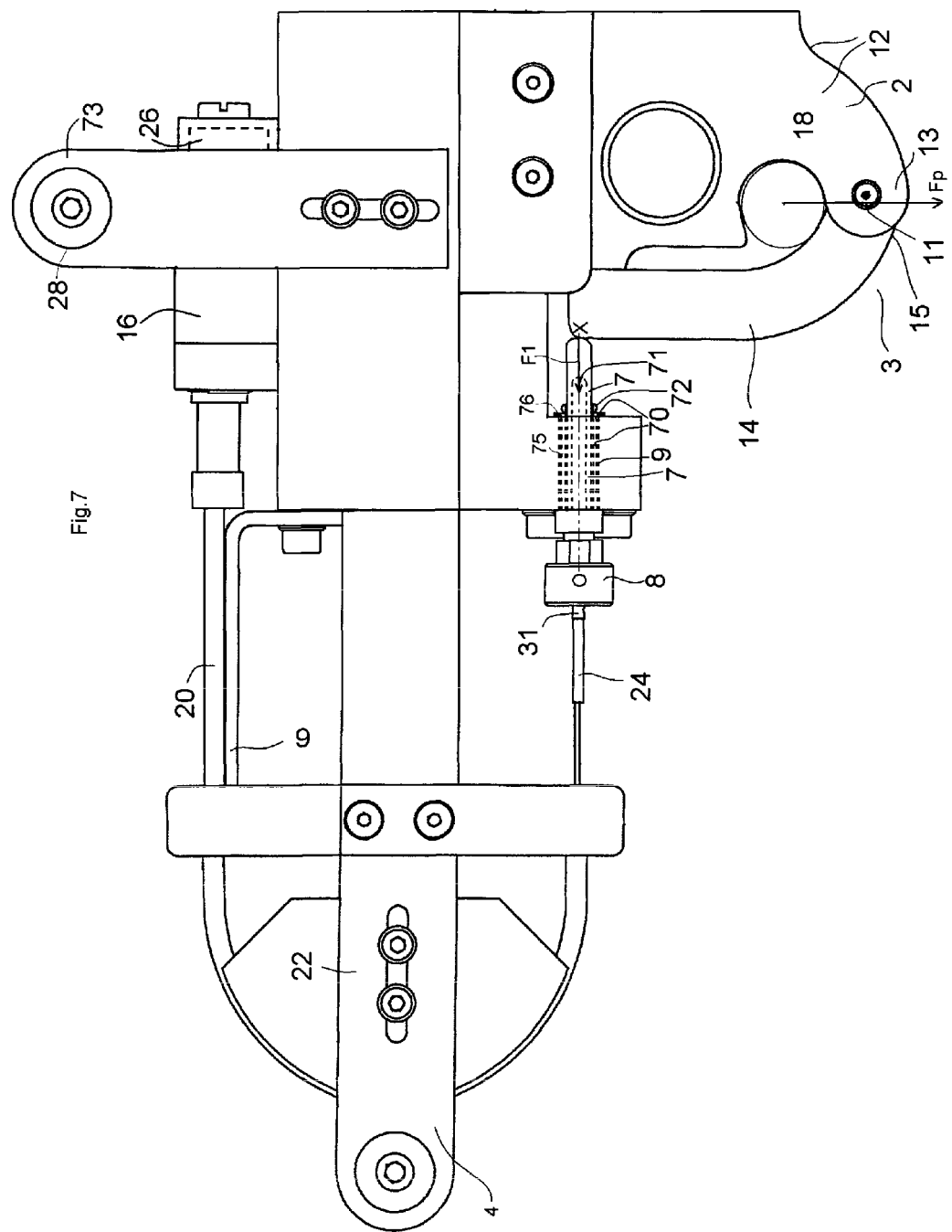

FIG. 7 shows another alternative embodiment of the invention.

Figure 1:
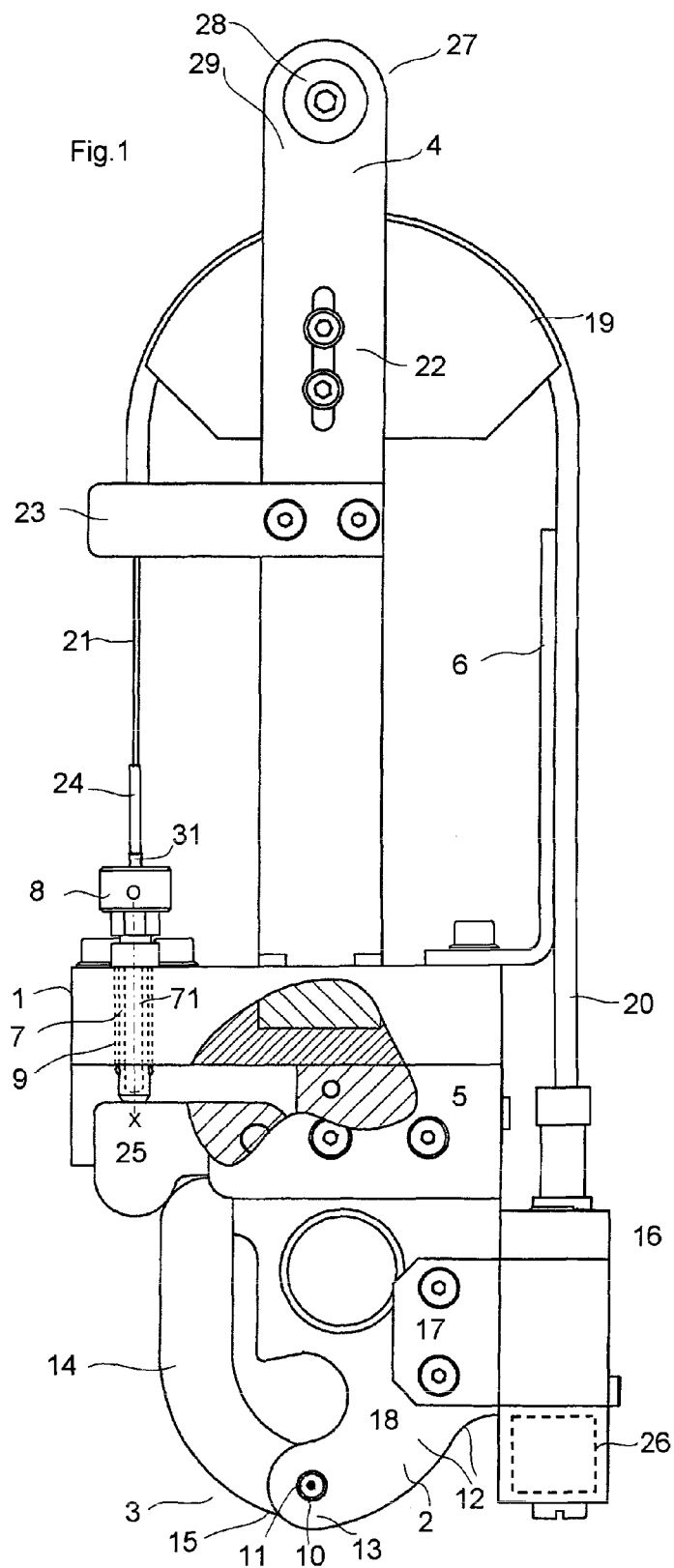
FIG. 1 shows a schematic drawing of a sectional view of an example of a securing/releasing device according to the invention in which the movable part of a hook is in a first position called operative position while a locking finger is itself in a first locking position.

FIG. 1 shows an example of a securing/releasing device 50 according to the invention.

This securing/releasing device 50 comprises a main body 1, also called support, and acting as a support for:

a first part 2 of a hook 3 via two parallel cheeks 5 welded to the support 1, an H-shaped yoke 4, an angle section 6, a ball spindle 8 comprising in an known manner a plunger 71 and a main body 7 arranged inside a bore 9 having an axis OX made in the support 1. The bore 9, the plunger 71 and the main body 7 of the ball spindle 8 are coaxial.

The first part of the hook 3 is constituted by two parallel C-shaped branches 12, one of which is secured onto one of the cheeks 5 and the other onto the other cheek 5. Each of the ends 13 of said branches opposing to the ones fixed onto the cheeks 5 comprises a bore 10, these bores being coaxial and a shaft 11 is pressed-fitted inside said bores and therefore connects said ends of the two branches 12.

The hook 3 comprises a second part 14, partially curved, with, at its first end 15, a bore having a diameter slightly higher than the one of the shaft 11. This second part 14 is partially arranged between said two branches 12, the shaft 11 passing through the bore made in said first end 15 of said second part. Thus, the second part of the hook is able to rotate about the shaft 11 connected to said branches 12.

Figure 2:
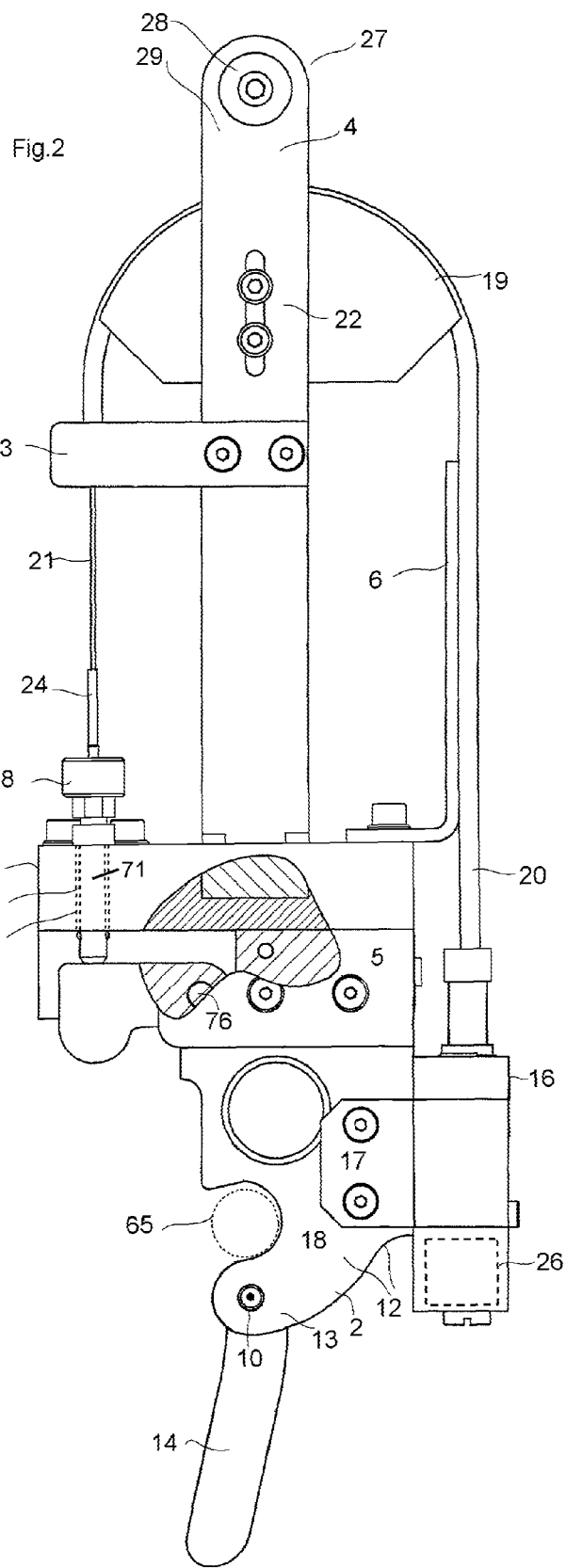
FIG. 2 shows the same sectional view as that of FIG. 1 but in which the movable part of a hook is in a second position.

Therefore, the hook then comprises a first part 2 secured to the support 1 and a second part 14 movable with respect to the first part 2 between a first position called raised position where said first and second parts form the hook 3 shown in FIG. 1 and a second position, shown in FIG. 2, where the first and second parts do not form said hook anymore. However, in both positions, the second part 14 of the hook 3 comprises a securing to the first fixed part 2 via the rotation shaft 11.

Figure 3:
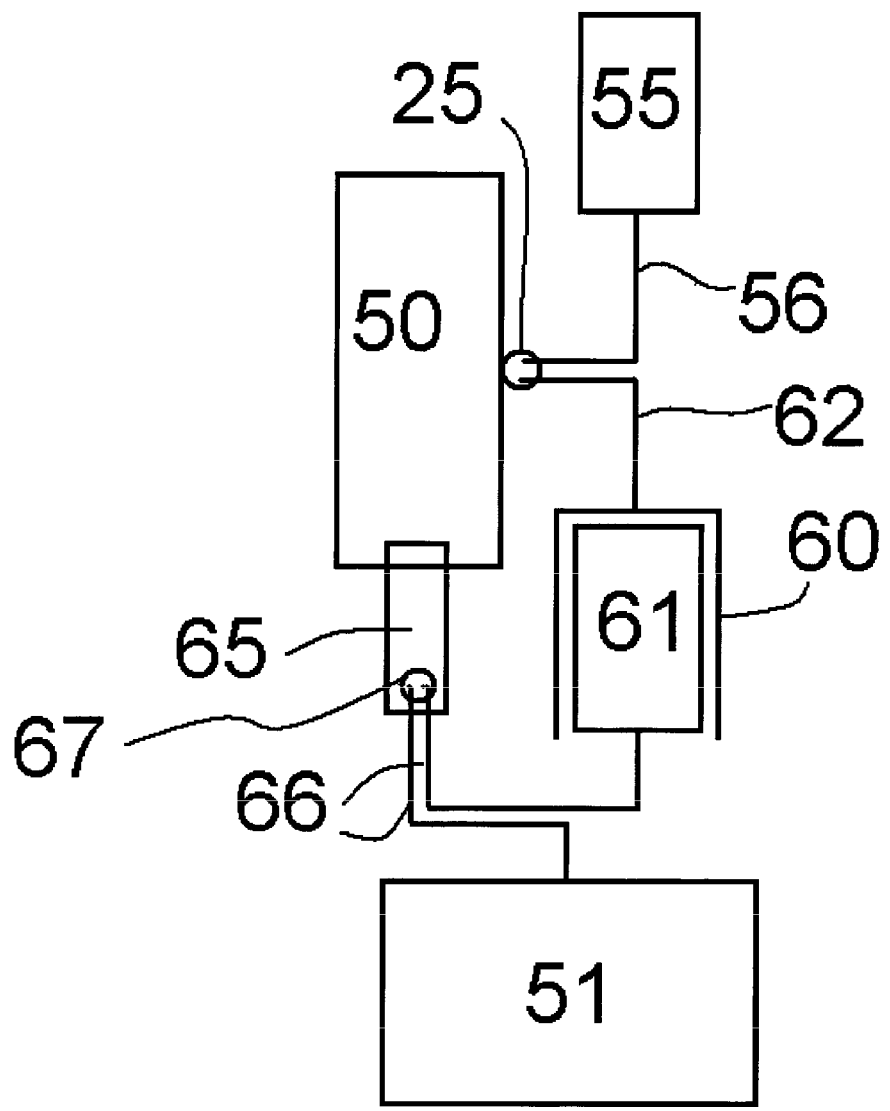
FIG. 3 shows the same sectional view as that of FIG. 1 but in which the locking finger is in a second position able to allow the release of said movable part of the hook.
Figure 4:
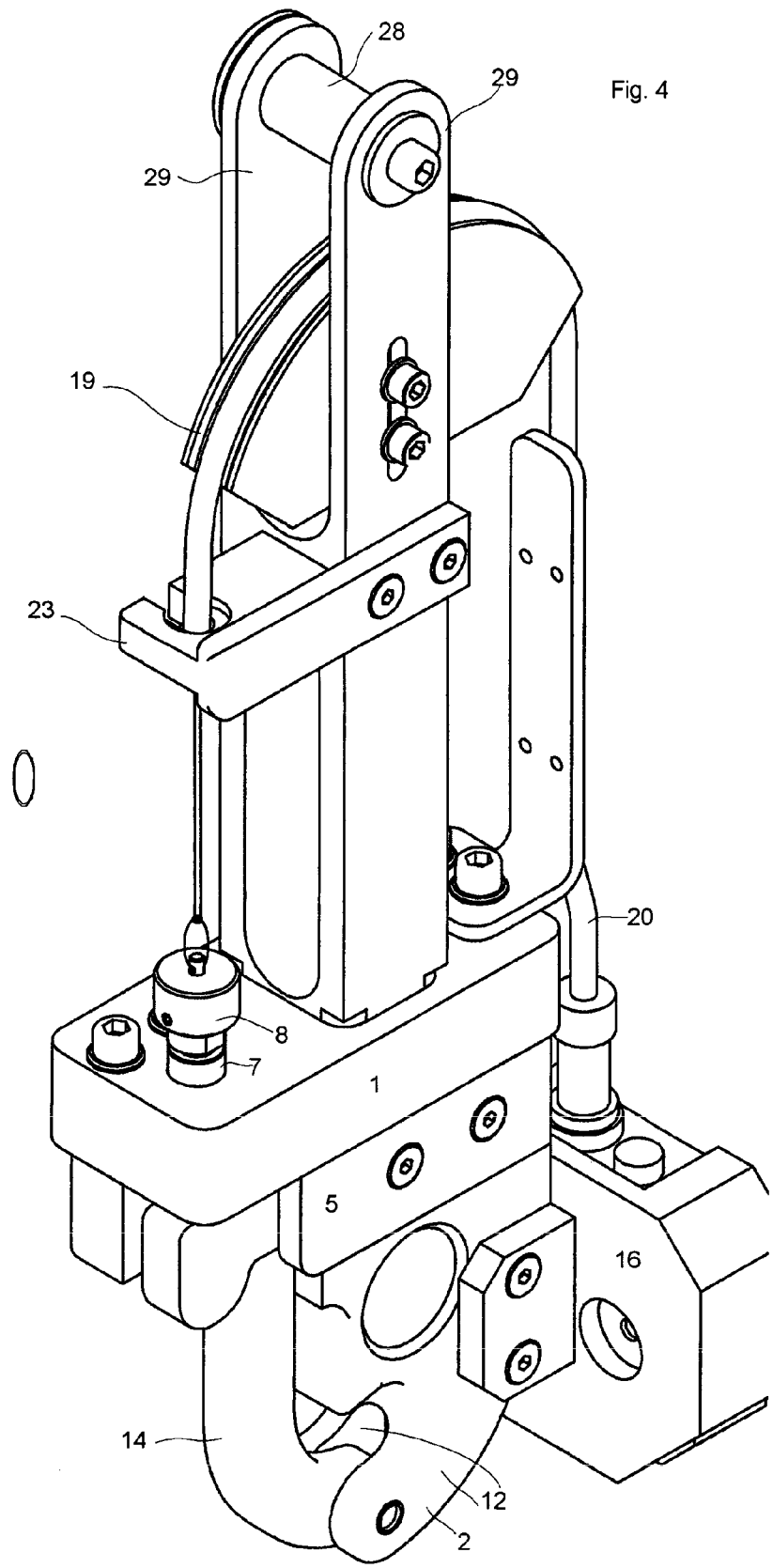
FIG. 4 shows a perspective view of the device according to FIG. 1.

This device 50 comprises means (7, 8, 71, 25) for locking and unlocking the first position of said second movable part 14 of the hook, the latter being in an operative position able to support a load only when, on the one hand, the second part of the hook is in its first position and, on the other hand, the locking and unlocking means are in the locked position. In this exemplary embodiment, the locking means comprise:

on the one hand, an L-shaped movable finger 25 secured to the cheeks 5 by a rotation shaft 76, and movable between a first position where the base of the L is able to be in contact with the second movable part 14 of the hook 3, the latter being then in its operative position and a second position, shown in FIG. 3, able to allow the release of said second part 14 of the hook 3 from the locking finger 25, on the other hand, a second member, namely a ball spindle 8 secured to the end of a cable 21 and able to assume, according to the position of this cable 21, at least two positions, a first position of which where it is inserted in the main body 7 of the spindle 8 and in which it blocks the locking finger 25, and consequently the second part 14 of the hook, in its first position and a second position in which it is extracted from the main body 7 and in which the locking means 25, and also the second part 14 of the hook, are unlocked.

A housing 16 containing a chrono-barometric trigger 26 is secured via a fastening tab 17 to a side surface 18 of one of the branches 12 of the fixed part 2 of the hook and connected to a sheath 20 inside which the metallic cable 21 passes. This chrono-barometric trigger 26 is able to drive the retraction of a part of said metallic cable 21 inside the housing 16 when it detects a pressure higher than a preset threshold. This movement of the cable is able to extract the ball spindle 8 from the main body 7 of the spindle 8, thereby causing a release of the locking finger 25.

The sheath 20 is fixed onto the angle section 6 and passes around an area of a semicircular reel 19 fixed onto a middle part 22 of the yoke 4. It then continues up to a plate 23 having a sheath-stopping function and secured onto the middle part of the yoke 4. The latter further comprises in its upper part 27 a shaft 28 which connects its two upper branches 29. The metallic cable 21 has a length higher to that of the sheath: it continues in the direction of the ball spindle 8: its end exceeding the sheath 20 is secured to a ring 24, the diametrically opposed end of which is inserted in a bore being made in an inner shaft 31 of the ball spindle 8 comprising, at its opposed end, a semicircular groove able to allow the retraction of the balls of the spindle inside the main body 7 of the spindle 8 and consequently the release of the plunger 71 from the main body 7 of the spindle 8.

FIG. 3 shows a device 50 according to the invention applied to the airdropping of a load 51.

A first stabilization parachute 55 is secured via a strap 56 and a first snap hook to the shaft 28 secured in the upper part 27 of the yoke 4 of the device 50.

The bag 60 of a main parachute 61 is secured by a second snap hook and a strap 62 to the same shaft 28.

A shackle 65 comprising openings 67 at each of its ends is hung to the hook 3 of the device 50. Straps 66 are secured to the shackle via said openings. These straps are connected, on the one hand, to the main parachute 61 and, on the other hand, to the load 51.

FIG. 6 schematizes the direction of the forces exerted by the movable part of the hook onto the locking finger in the context of an assembly according to FIG. 5.

The hook 3 is subjected to the weight Fp of the first member (the shackle 65), of the main parachute and of the load 51. The movable part 14 of the hook exerts on the locking finger 25 a force Fc which, because of the shape of the parts in contact, comprises a vertical component F1 of a direction opposed to that of the weight Fp and a horizontal component taken up by the rotation shaft of the locking finger 25.

The vertical component F1 is virtually integrally transmitted to the free end of the main body 7 of the ball spindle 8, which allows its extraction from the bore 9 as soon as the plunger 71 is removed from the main body 7 of the spindle 8 and consequently the balls can enter within the main body 7.

Thus, the locking finger 25 has a double function, since, on the one hand, it allows, by cooperating with the ball spindle 8, to lock or unlock the second part of the hook and, on the other hand, it transforms a part of the weight of the shackle 61 and of the load 51 which exerts vertically downwardly in a force F1 directed along the axis OX of the bore 9, of the plunger 71 and of the main body of the spindle 8, in this case, in this exemplary embodiment, vertically upwardly.

In this exemplary embodiment, as shown in this figure, the ratio between the force F1 along the axis OX and the force F2 perpendicular to OX exerted by the locking finger on the free end of the main body of the spindle 8 is higher than 10.

Obviously, the force F1 is proportional to the mass of the first member and of the load and of the main parachute. If the load has a mass of one ton, F1 is virtually proportional to the weight of the load, the weights of the first member and of the main parachute being negligible with respect to that of the load.

The operation of this device is as follows:

The shackle 65 is secured by straps, on the one hand to the load 51 and, on the other hand, to the main parachute 61 wrapped up in the bag 60.

A stabilization parachute as well as the bag 60 of the main parachute are secured to the shaft 28 of the device 50 according to the invention by snap hooks connected to straps.

The plunger 71 is extracted from the main body 7 of the spindle 8 and the locking finger 25 is pushed in the direction of the support 1 in order to release the movable part 14 of the hook 3 so that it is in the position of FIG. 2.

The shackle 65 is then positioned against the fixed part of the hook, as shown in a dashed line in FIG. 2, and then the locking finger 25 is lifted in the direction of the support and the movable part is placed back in its first position. The locking finger 25 is then lowered and the plunger 71 is inserted in the main body 7 of the spindle 8 in order to block the locking finger 25 and consequently the second movable part 14 of the hook 3 in its first position called operative position.

The chrono-barometric trigger is then operated and the triggering altitude is programmed. It is then switched off.

The thus formed assembly is then transported on board a plane. Just before airdropping the load, the chrono-barometric trigger is turned on, and the assembly is airdropped. Immediately after airdropping, the first stabilization parachute 65 automatically deploys.

When the chrono-barometric trigger detects the preprogrammed altitude, it triggers the retraction of a part of the cable 21 inside the housing 16. This retraction causes the removal of the plunger 71 from the main body 7 of the spindle 8, therefore unlocking the locking finger 25. Because of the weight Fp of the load, the end of the movable part 14 of the hook 3 which is in contact with the locking finger produces a force on the latter in the direction of the support, this force being sufficient to allow, because of the rounded shape of the two surfaces in contact, a sliding of the end of the movable part 14 of the hook with respect to the rounded surface of the locking finger and consequently the release of the movable part of the hook. The shackle 65 is then released from the hook 3 and separates from the latter, the device 50 still being slowed down by the stabilization parachute 55. As the main parachute 61 is secured to the load 51 whereas the bag 60 in which it is wrapped up is secured to the device 50, said separation causes the extraction of the main parachute 61 from its bag 60 which can then deploy and efficiently slow down the load up to the landing, while the stabilization parachute is sufficient to efficiently slow down the device 50 up to the landing.

As the separation takes place at a low altitude, typically less than 500 m, the load 51 and the device 50 land separately but at a close distance from each other.

FIG. 7 shows an another alternative embodiment of the invention in which the locking finger 25 has been suppressed. This alternative substantially comprises the same members as those of FIGS. 1 to 6 but the first means (4, 16, 21, 26) able to trigger the release of the load 51 and of the shackle 65 of the hook 3 as well as the locking means, namely the ball spindle 8, are, with respect to the said figures, offset with an angle of π/2 radian and the shape of the support is adjusted in a known manner to this new disposition in which the free end of the main body 7 of the spindle 8 is in direct contact with the end of the movable part 14 of the hook. It also comprises an additional yoke 73 vertically arranged with a shaft 28 able to retain a secondary parachute, same as the shaft 28 of FIG. 2.

With respect to said FIGS. 1 to 6, an additional member has been introduced between the edges of the bore 9 and the main body 7 of the ball spindle 8, namely a ring 75 made of a steel harder than the constituting material of the support. This ring comprises a crown-shaped shoulder at one of its ends, said shoulder against which the balls 72 of the spindle 8 lie when the spindle is secured to the support.

This ring allows to choose a material that is less hard and therefore less expensive than for the support and, on the other hand, in case of a degradation of the shoulder, allows to change only the ring.

The hook 3 is subjected to the weight Fp of the first member (the shackle 65), of the main parachute and of the load 51. The movable part 14 of the hook supports a part of the weight Fp and integrally transmits this force to the free end of the main body 7 of the spindle 8 against which it is in contract. A force F1 directed along OX is therefore applied onto the main body of the spindle while along the axis perpendicular to OX the force applied to the main body 7 is extremely low. In this exemplary embodiment, the ratio between the force F1 along the axis OX and the force F2 perpendicular to OX exerted on the free end of the main body of the spindle 8 is much higher than 3 and higher than 10 (in the order of 20).

Many modifications may be brought to the previously described embodiment without departing from the scope of the invention.

Therefore, the retractation of the cable may take place after the detection by a sensor inserted in the housing able to detect a signal emitted by a person on the ground.

Moreover, the cable can be replaced for example by electrical means able to remove the ball spindle upon receiving a signal emitted by the sensor.

Furthermore, the locking means may be of a different nature and have a different shape while keeping their functionality.

Furthermore, the angle between OX and the vertical can be different from 0 or π/2 as shown in the figures but preferably between 0 and π.

The invention claimed is:

1. A device for securing/releasing a first member able to support a load up to several tons, and a second member able to support the first member and said load, the second member comprising a support onto which are secured:
    first means able to trigger release of said first and second members,
    a hook comprising a first fixed part secured to the support and a second part able to support a part of the load and movable with respect to the first part between i) a first position called raised position where said first and second parts form a hook, and ii) a second position where the first and second parts do not form said hook anymore, the second movable part comprising a first end secured to the first part, by a rotation shaft and supporting at least partially the weight of said load and of the first member when the device is in operation, and
    locking and unlocking means of the first position of said second movable part of the hook, the first means being able to control the unlocking of the first position of said second movable part of the hook,
    wherein the locking means comprise a ball spindle comprising a plunger and a main body provided concentrically directly or indirectly in a bore having an axis OX made in the support or in a member which is secured to the support, the first means being one of i) connected to the plunger of the spindle and able to control displacement of the plunger, and ii) connected to the plunger of the spindle and able to control the displacement of the plunger, and
    wherein, in operation, when the second movable part of the hook is locked in the first position called raised position and when the hook supports the first member and the load, the second movable part of the hook is able to exert, directly or indirectly, on the main body of the ball spindle and along the axis OX, a force F1 proportional to the mass of the first member and of the load.

2. The securing/releasing device according to claim 1, wherein, in operation, when the hook supports the first member and the load, the second movable part of the hook is able to exert, directly or indirectly, a force decomposing in a first force F1 on the main body of the spindle along the axis OX and, a second force F2 on the main body of the spindle having an axis OY perpendicular to OX, the F1/F2 ratio of the first force to the second force being at least equal to 3.

3. The securing/releasing device according to claim 1, wherein the first means are able to control a partial or complete release of the plunger from the main body of the spindle.

4. The device according to claim 1, wherein the locking means comprise a first movable assembly and a second movable assembly, the first assembly being constituted by said ball spindle able to assume at least two positions, of which a first position where the ball spindle is secured to the support or in a member which is secured to the support and a second position where the ball spindle is released from the support or from the member which is secured to the support, the second assembly being constituted by movable means between a first position called locking position where the movable means are able, in cooperation with said spindle, to block the second part of the hook in the first position, and a second position of unlocking the second part of the hook.

5. The device according to claim 4, wherein the second assembly is constituted by an L-shaped locking finger secured to the support by a rotation shaft and being movable with respect to the support between a first position where a part of the second assembly is able to be in contact with the second movable part of the hook, the hook being then in an operative position and a second position able to allow the release of said second part of the hook from the locking finger.

6. The device according to claim 2, wherein the locking finger comprises a base able to contact the free end of the second part of the hook and the base and free end able to be in contact are of a rounded shape.

7. The device according to claim 6, wherein the free end of the main body of the spindle lies on the first third of the length of the part of the locking finger which is perpendicular to the free end of the main body of the spindle, starting from the base.

8. The device according to claim 1, wherein the first means comprise a sensor able to trigger the release of said first and second members upon exceeding a threshold or receiving an exterior signal.

9. The device according to claim 8, wherein the ball spindle is secured to a cable and the sensor is able to control the displacement of the cable upon exceeding a threshold or receiving an exterior signal.

10. The device according to claim 1, wherein a semicircular reel is secured to the support and the locking means are at least partially arranged on a side of the reel while the sensor is arranged on the other side of the reel and the cable lies partially on the reel.

11. A device for airdropping a load from a flying vehicle comprising a securing/releasing device according to claim 1, the support of which is connected to a first parachute called stabilization parachute and, to the bag of a second parachute called main parachute.

12. The airdropping device according to claim 11, further comprising a first member secured to the main parachute and to the load and hung to said hook.

13. The airdropping device according to claim 11, wherein said first member comprises a middle cylindrical part and the lower part of the hook forms a cylindrical opening complementary to that of the cylindrical part of the first member.

14. A device for securing/releasing a first member able to support a load higher than 200 kg and connected to a main parachute, and a second member able to support the first member and said load, the second member being secured to a stabilization parachute and comprising, a support onto which are secured first means comprising a sensor able to trigger, during the flight, the release of said first and second members upon exceeding a threshold or receiving an exterior signal, the second member comprising a hook, comprising a first fixed part secured to the support and a second part movable with respect to the first part between a first position called raised position where said first and second parts form a hook and a second position where the first and second parts do not form said hook anymore, the second movable part comprising a first end secured to the first part by a rotation shaft, locking and unlocking means of the first position of said second movable part of the hook, the sensor being able to control the unlocking of the first position of said second movable part of the hook, wherein the locking means comprise:

a first member comprising an L-shaped movable finger secured to the support by a rotation shaft, and movable between a first position where the base of the L is able to be in contact with the second movable part of the hook, the hook therefore being in an operative position and a second position able to allow the release of said second part of the hook from the locking finger, a second member constituted by a ball spindle movable between at least two positions, of which a first position where the second member blocks the locking finger in the first position and a second position where the locking finger is unlocked, the sensor being able to control the passage of the second member from the first to the second position.

15. The securing/releasing device according to claim 2, wherein the first means are able to control a partial or complete release of the plunger from the main body of the spindle.

16. The device according to claim 2, wherein the locking means comprise a first movable assembly and a second movable assembly, the first assembly being constituted by said ball spindle able to assume at least two positions, of which a first position where the ball spindle is secured to the support or in a member which is secured to the support and a second position where the ball spindle is released from the support or from the member which is secured to the support, the second assembly being constituted by movable means between a first position called locking position where they are able, in cooperation with said spindle, to block the second part of the hook in the first position, and a second position of unlocking the second part of the hook.

17. The device according to claim 3, wherein the locking means comprise a first movable assembly and a second movable assembly, the first assembly being constituted by said ball spindle able to assume at least two positions, of which a first position where the ball spindle is secured to the support or in a member which is secured to the support and a second position where the ball spindle is released from the support or from the member which is secured to the support, the second assembly being constituted by movable means between a first position called locking position where they are able, in cooperation with said spindle, to block the second part of the hook in the first position, and a second position of unlocking the second part of the hook.

18. The device according to claim 8, wherein the sensor is of an altimeter or chrono-barometric type.

19. The device according to claim 14, wherein the sensor is of an altimeter or chrono-barometric type.

\* \* \* \* \*